United States Patent
Feng et al.

(10) Patent No.: US 8,828,256 B2
(45) Date of Patent: Sep. 9, 2014

(54) METHOD FOR FABRICATING CARBON NANOTUBE FILM

(75) Inventors: Chen Feng, Beijing (CN); Kai Liu, Beijing (CN); Yong-Chao Zhai, Beijing (CN); Kai-Li Jiang, Beijing (CN); Shou-Shan Fan, Beijing (CN)

(73) Assignees: Tsinghua University, Beijing (CN); Hon Hai Precision Industry Co., Ltd., New Taipei (TW)

( * ) Notice: Subject to any disclaimer, the term of this patent is extended or adjusted under 35 U.S.C. 154(b) by 610 days.

(21) Appl. No.: 12/319,595

(22) Filed: Jan. 8, 2009

(65) Prior Publication Data

US 2009/0301993 A1 Dec. 10, 2009

(30) Foreign Application Priority Data

Jun. 4, 2008 (CN) .......................... 2008 1 0067588

(51) Int. Cl.
| | | |
|---|---|---|
| *B44C 1/22* | (2006.01) | |
| *C03C 15/00* | (2006.01) | |
| *C03C 25/68* | (2006.01) | |
| *C23F 1/00* | (2006.01) | |
| *C01B 31/02* | (2006.01) | |
| *B82Y 30/00* | (2011.01) | |
| *B82Y 40/00* | (2011.01) | |

(52) U.S. Cl.
CPC ......... *C01B 31/0233* (2013.01); *C01B 31/0253* (2013.01); *B82Y 30/00* (2013.01); *C01B 2202/08* (2013.01); *B82Y 40/00* (2013.01); *Y10S 977/734* (2013.01); *Y10S 977/742* (2013.01)
USPC ................ 216/67; 257/E51.038; 257/E51.04; 977/734; 977/742

(58) Field of Classification Search
CPC ........................ C01B 31/0253; C01B 2202/08
USPC ........ 216/67; 257/E51.038, E51.04; 977/734, 977/742
See application file for complete search history.

(56) References Cited

U.S. PATENT DOCUMENTS

| | | | |
|---|---|---|---|
| 2004/0053780 A1* | 3/2004 | Jiang et al. ..................... | 502/182 |
| 2007/0237959 A1* | 10/2007 | Lemaire ........................ | 428/408 |
| 2008/0081176 A1* | 4/2008 | Huang et al. .................. | 428/323 |
| 2008/0095695 A1* | 4/2008 | Shanov et al. ............. | 423/447.3 |
| 2008/0175785 A1* | 7/2008 | Mitra et al. ............... | 423/445 B |

(Continued)

FOREIGN PATENT DOCUMENTS

| | | |
|---|---|---|
| JP | 2007-99975 | 4/2007 |
| TW | 200407259 | 5/2004 |

OTHER PUBLICATIONS

Liu et al. "Controlled Growth of Super-Aligned Carbon Nanotube Arrays for Spinning Continuous Unidirectional Sheets withs Tunable Physical Properties." Nano Letters, Feb. 13, 2008. American Chemical Society. vol. 8 No. 2, p. 700-705.*

(Continued)

*Primary Examiner* — Allan Olsen
*Assistant Examiner* — Margaret D Klunk
(74) *Attorney, Agent, or Firm* — Novak Druce Connolly Bove + Quigg LLP

(57) ABSTRACT

A method for making a carbon nanotube film includes the steps of providing an array of carbon nanotubes, treating the array of carbon nanotubes by plasma, and pulling out a carbon nanotube film from the array of carbon nanotubes treated by the plasma.

16 Claims, 3 Drawing Sheets

(56) References Cited

U.S. PATENT DOCUMENTS

| | | | |
|---|---|---|---|
| 2008/0185936 A1* | 8/2008 | Panchapakesan et al. | 310/306 |
| 2008/0192407 A1* | 8/2008 | Lu et al. | 361/502 |
| 2008/0248235 A1* | 10/2008 | Feng et al. | 428/113 |
| 2008/0302759 A1* | 12/2008 | Zhang | 216/13 |
| 2009/0011232 A1* | 1/2009 | Dai et al. | 428/355 R |

OTHER PUBLICATIONS

Huang and Dai. "Plasma Etching for Purification and Controlled Opening of Aligned Carbon Nanotubes" J. Phys. Chem. B, Mar. 19, 2002. American Chemical Society. vol. 106, p. 3543-3545.*

Zhang et al. "Strong, Transparent, Multifunctional, Carbon Nanotube Sheets." Science, Aug. 19, 2005. AAAS, vol. 309, p. 1215-1219.*

Kai Liu et al., "Controlled Growth of Super-Aligned Carbon Nanotube Arrays for Spinning Continuous Unidirectional Sheets with Tunable Physical Properties," Nano Letters, vol. 8, No. 2, pp. 700-705, Feb. 13, 2008.

Shaoming Huang and Liming Dai, "Plasma Etching for Purification and Controlled Opening of Aligned Carbon Nanotubes," J. Phys. Chem. B, vol. 106, No. 14, pp. 3543-3545, Mar. 19, 2002.

htp://www.esciencenews.com,The effects of hydrogen on growing carbon nanotubes, American Institude of Physics, Oct. 5, 2010.

Yongfeng Luo et al. Synthesis of High-Quality Carbon Nanotube Arrays without the assistance of water, Journal of Nanomaterials, pp. 1-5, vol. 2012.

Michael J. Behr et al., Effect of hydrogen on catalyst nanoparticles in carbon nanotube growth, Journal of Applied Physics, Sep. 13, 2010, pp. 053303-1 to 053303-8, vol. 108.

* cited by examiner

METHOD FOR FABRICATING CARBON NANOTUBE FILM

BACKGROUND

1. Field of the Disclosure

The present disclosure relates to a method for fabricating a carbon nanotube and, particularly, to a method of manufacturing a carbon nanotube film composed of multiple carbon nanotubes using plasma treatment.

2. Discussions of the Related Art

Carbon nanotubes (CNTs) have a high Young's modulus, high thermal conductivity, and high electrical conductivity, among other properties, making them an ideal composite material supplement. It has thus been suggested that CNT composite materials can play an important role in fields such as microelectronics, material science, biology, and chemistry.

However, the main obstacle to an actual application of CNTs is the difficulty to process the powdered form of CNT products. Therefore, CNTs are formed into films to facilitate handling and processing thereof.

Currently, different methods are widely used for fabricating CNT films including a growing method, a spraying method, and a Langmuir-Blodgett (LB) method.

In the growing method, a CNT film is grown on a chemically functionalized substrate directly by adopting multiple catalyst layers. In the spraying method, CNTs, dispersed in a solvent, are sprayed on a substrate. In the LB method, CNTs are soluble through an introduction of amide groups therein, and then through a step of "molecular self-assembly", the film accumulates on a substrate.

However, the CNT films manufactured by the three methods mentioned above are incapable of actualizing self-supporting function, and of sufficiently utilizing favorable radial conductive capability due to a disordered arrangement of CNT contained in the CNT films. In addition, the CNT films manufactured by the three methods have relatively high thickness and poor transparency and are incapable of replacing related Indium Tin Oxide (ITO) materials to manufacture transparent and electric thin film.

What is needed, therefore, is a CNT film structure and a method for fabricating the same, to overcome the aforementioned shortcomings.

BRIEF DESCRIPTION OF THE DRAWINGS

Many aspects of the present method for fabricating a CNT film can be better understood with reference to the following drawings. The components in the drawings are not necessarily drawn to scale, the emphasis instead being placed upon clearly illustrating the principles of the present CNT film.

Figure 1:
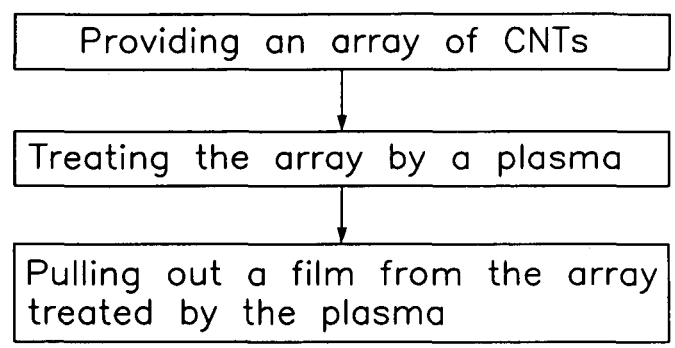
FIG. 1 is a flow chart of one embodiment of a method for fabricating a CNT film treated by the plasma.

Corresponding reference characters indicate corresponding parts throughout the several views. The exemplifications set out herein illustrate at least one embodiment of the present method for fabricating CNT film, in one form, and such exemplifications are not to be construed as limiting the scope of the invention in any manner.

DETAILED DESCRIPTION

Reference will now be made to the drawings to describe one embodiment of the present method of fabricating CNT film, in detail.

Referring to FIG. 1, a method for fabricating a CNT film is shown. Depending on the embodiment, certain of the steps described below may be removed, others may be added, and the sequence of steps may be altered. The method includes the steps of: (a) providing an array of CNTs; (b) treating the array of CNTs using plasma treatment such as a plasma etching process; (c) pulling out a plurality of yarns from the array of CNTs to form the CNT film using a tool such as adhesive tape, tweezers, clamps, or any tool allowing multiple CNTs to be gripped and pulled simultaneously.

In step (a), the array of CNTs can be a super-aligned array of CNTs fabricated by a chemical vapor deposition method and includes the substeps of: (a1) providing a substantially flat and smooth substrate; (a2) forming a catalyst layer on the substrate; (a3) annealing the substrate with the catalyst layer with a temperature from about 700° C. to about 900° C. in air for about 30 to about 90 minutes; (a4) heating the substrate with the catalyst layer in a temperature from about 500° C. to about 740° C. in a furnace with a protective gas therein; and (a5) supplying a carbon source gas into the furnace for about 5 to about 30 minutes to form the super-aligned array of CNTs from the substrate.

In step (a1), the substrate can be a P-type silicon wafer, an N-type silicon wafer, or a silicon wafer with a film of silicon dioxide thereon. In the present embodiment, a 4-inch P-type silicon wafer is used as the substrate.

In step (a2), the catalyst can be made of iron (Fe), cobalt (Co), nickel (Ni), or any alloy thereof.

In step (a4), the protective gas can be made up of at least one of nitrogen ($N_2$), argon (Ar), and a noble gas. In present embodiment, the protective gas is argon (Ar). In step (a5), the carbon source gas can be a hydrocarbon gas, such as ethylene ($C_2H_4$), methane ($CH_4$), acetylene ($C_2H_2$). In the present embodiment, the carbon source gas is acetylene ($C_2H_2$).

The super-aligned array of CNTs can be a height of about 50 microns to about 5 millimeters and includes a plurality of CNTs parallel to each other and substantially perpendicular to the substrate. The super-aligned array of CNTs formed under the above conditions is essentially free of impurities, such as carbonaceous or residual catalyst particles. The CNTs in the super-aligned array are packed closely together by van Der Waals force.

In step (b), the array of CNTs with the substrate is placed in a chamber, a reactive gas is introduced into the chamber to form the plasma of the reactive gas, and the plasma reacts with the array of CNTs. In one embodiment, the chamber is contained in a Reactive Ion Etching (RIE) machine. The chamber receiving the array of CNTs and the substrate is vacuum-exhausted to create a vacuum chamber. Then, the reactive gas is introduced into the vacuum chamber. The reactive gas can be oxygen, hydrogen, or carbon tetrafluoride ($CF_4$). In the present embodiment, the reactive gas is oxygen. The plasma of the reactive gas is produced by a glow discharge reaction and reacts with the array of CNTs. Particularly, the plasma of the reactive gas comprises charged ions and charged electrons which hit the surface of the CNTs, or reacts with the carbon atoms in the CNTs to produce gases such as carbon dioxide to physically and/or chemically etch the array of CNTs. Accordingly, during the treatment of the plasma to the array of CNTs, the disordered CNTs at the top section of the array of CNTs can be etched. Depending on the different species of the reactive gas, the plasma of the reactive gas comprises oxygen plasma, hydrogen plasma, or carbon tetrafluoride plasma. In the present embodiment, the plasma is oxygen plasma. The gas pressure of the reactive gas is from about 1 to about 100 Pa. In the present embodiment, the gas pressure is 10 Pa. The reactive gas flow rates is from about 10 to about 100 standard cubic centimeters per Minute (sccm). In the present embodiment, the reactive gas flow rate is about 50 sccm. The power of the glow discharge reaction is from about 20 to about 300 watts. In the present embodiment, the power is about 150 watts. The reactive time of the plasma etching process is from about 10 seconds to about 1 hour. In the present embodiment, the reactive time is about 15 seconds to about 8 minutes.

The array of CNTs is a closely packed arrangement structure. The plasma etches the surface of the array of CNTs. By controlling a proper pressure and etch time in the vacuum chamber, the plasma is incapable of infiltrating into an inner structure of the array of CNTs. Thus, the inner structure of the array of CNTs cannot be etched. Accordingly, after the etching process, the thickness of the array of CNTs is reduced, the length of each CNT is shortened, and the inner structure of the CNTs is undamaged. It is to be understood that the etching time cannot be too long or too short. If the etching time is too long, the array of CNTs and the species of the plasma react excessively, with the array of CNTs too thin to be withdrawn. When the process time of the plasma etching is too short, the array of CNTs and the species of the plasma react insufficiently and the array of CNTs is too thick to enhance the transparency of the CNT film. Thickness of the array of CNTs , after plasma etching, can be 20 to 200 microns.

The height of the array of CNTs can be controlled by adjusting the reactive time of the plasma etching. Further, during the beginning phases of growth of the array, the growing conditions (gas pressure, growing temperature) are not very stable, such that the array of CNTs is disordered, that is, growing directions of the CNTs are not perpendicular to the substrate. After a period of time, the growing conditions become relatively stable, and the CNTs grow along a direction perpendicular to the substrate such that a CNT array is formed. Accordingly, during the treatment of the plasma to the array of CNTs in step (b), the disordered CNTs at the top section of the array of CNTs can be etched and removed resulting in a higher quality CNT arrays.

In step (c), the CNT film can be pulled out from the CNT arrays according to the substeps of: (c1) selecting a plurality of CNT sections having a predetermined width from the array of CNTs, and providing, for example, an adhesive tape adhered to the selected CNT sections; and (c2) pulling the CNT sections along a direction which is substantially perpendicular to the growing direction of the array of CNTs at a uniform speed to form the uniform CNT film.

During the pulling process, the CNT sections are drawn out in sequentially and connected end to end by van der Waals attractive forces to form the CNT film having a predetermined width. Each of the CNT sections includes a plurality of CNTs parallel to each other and held together by van der Waals attractive forces end to end.

Figure 2:
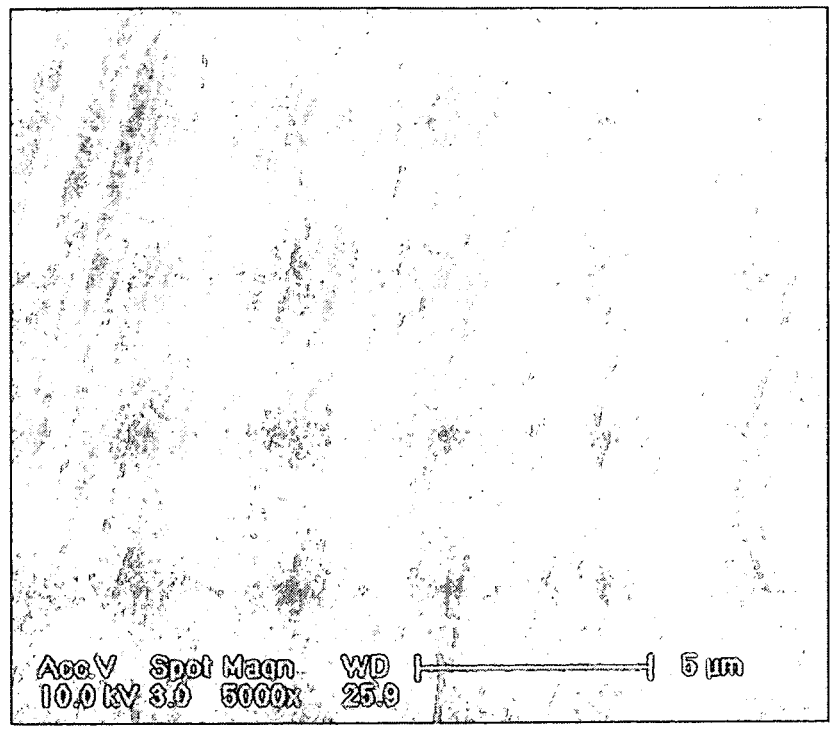
FIG. 2 shows a Scanning Electron Microscope (SEM) image of the CNT film fabricated by the method of FIG. 1.

The CNTs in the CNT film are all substantially parallel to the pulling direction of the CNT sections. The CNT film formed by the pulling/drawing method has more superior uniformity in thickness and transparency than a typical disordered CNT film. In addition, the pulling/drawing method is simple, fast, and suitable for most industrial applications. FIG. 2 shows a scanning electron microscope (SEM) picture of the CNT film. The transparent rate of the CNT film pulled from the array of CNTs reaches 90%.

The width and the length of the CNT film is dependant on the size of the substrate on which the array of CNTs is formed. However, the films can be stretched along its width. The length of the CNT film can be varied according to actual demands. In the present embodiment, the size of the substrate is about 4 inches, the width of the CNT film is about 0.01 to about 10 centimeters, and the thickness of the CNT film is about 0.5 nanometers to about 100 microns.

Figure 3:
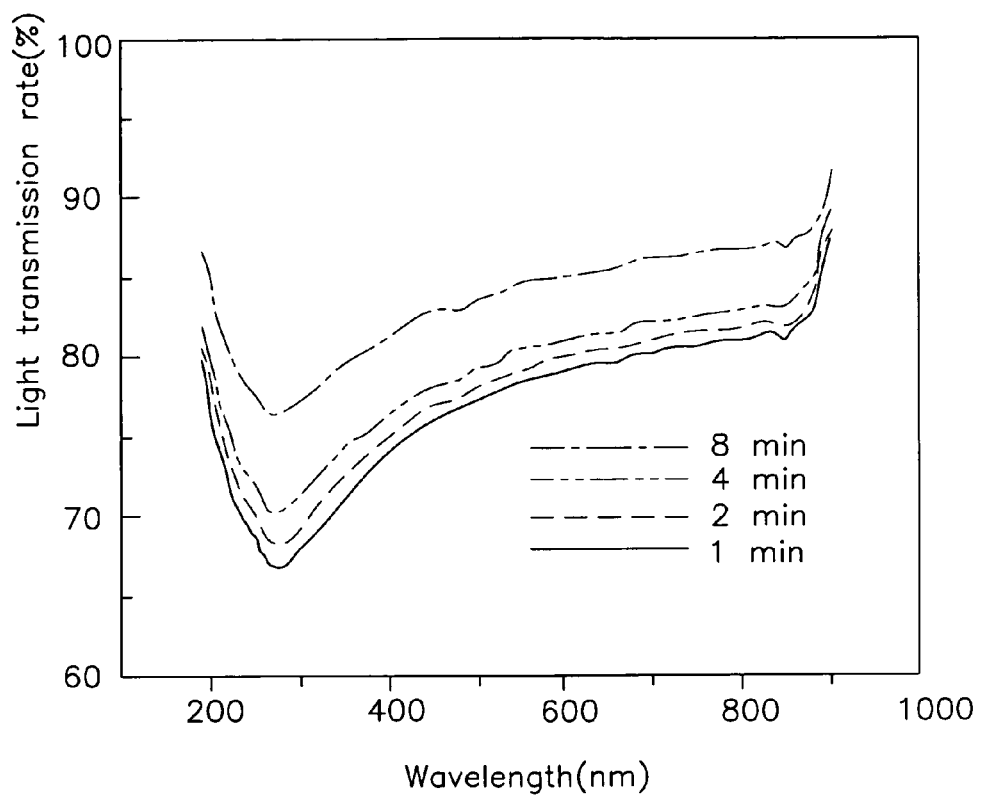
FIG. 3 shows light transmission rate curves of the CNT film treated by plasma treatment.

Referring to FIG. 3, in the present embodiment, the arrays of CNTs produced after about 15 minutes of growth time, the arrays of CNTs are treated by the oxygen plasma for 1, 2, 4, and 8 minutes, with power of about 150 W, with a gas pressure of about 10 Pa, oxygen flow rate of about 50 sccm, and are then drawn to form the CNT films. The visible light region in wavelengths is from about 380 to about 720 nm, and the light transmission rate of these CNT films reach above 70%. With increasing plasma etching time, the light transmission rate and the transparency of the CNT film gradually increase. The obtained CNT film drawn from the array of CNTs etched for about 8 minutes by the oxygen plasma was found to have a very good light transmission rate. A CNT film with a light transmission rate of 90%, by being irradiated with about 900 nanometer wavelength light for about 8 minutes was achieved.

Table 1 shows an example of the relationship between the oxygen plasma etching time and the height of the array of CNTs and the light transmission rate of the CNT film, with the same growth time of the array of CNTs. From Table 1, we can find that as the etching time increased, the height of the array of CNTs gradually decreased and the light transmission rate of the CNT film gradually increased. When irradiated at 550 nanometers wavelength light, the CNT film, which is pulled from the CNT array etched for about 8 minutes by the oxygen plasma, had about 85% light transmission rate.

TABLE 1

| Sample Num. | Growth time of the array of CNTs(min) | Etching Time of the oxygen Plasma (min) | Height of the array of CNTs (μm) | Light transmission rate at 550 nm light Wavelength (%) |
| --- | --- | --- | --- | --- |
| 1 | 15 | 1 | 183 | 78.5 |
| 2 | 15 | 2 | 168 | 79.3 |
| 3 | 15 | 4 | 127 | 80.5 |
| 4 | 15 | 8 | 74 | 84.8 |

The CNTs in the CNT array has such a high purity and a high specific surface area that the CNT film acts like an adhesive and can be adhered to different substrates according to different requirements.

An additional step of treating the CNT film with an organic solvent can be conducted after step (c). The organic solvent may be volatile such as ethanol, methanol, acetone, dichloroethane, chloroform, and combinations thereof. The CNT film can be treated by applying the organic solvent to the CNT film, such as soaking the entire surface of the CNT film or immersing the CNT film into a container having an organic solvent therein. After being soaked by the organic solvent, the CNTs will bundle together to form CNT stings. They bundle together, due to the surface tension of the organic solvent. In one aspect, part of the CNTs in the untreated CNT film that are not adhered on the substrate will come into contact with the substrate after the organic solvent treatment due to the surface tension of the organic solvent. The contacting area of the CNT film with the substrate will increase, and the CNT film can more firmly adhere to the surface of the substrate. In another aspect, due to the decrease of the specific surface area via bundling, the mechanical strength and toughness of the CNT film are increased and the coefficient of friction of the CNT films is reduced. Macroscopically, the film will be an approximately uniform CNT film. Obviously if the untreated film is not on a substrate, the same process of bundling will occur.

Compared to related arts, the present CNT film has at least the following advantages. First, using plasma to etch the array of CNTs can remove the disordered tops of the array of CNTs to increase the transparency of the CNT film pulled from the etched array of CNTs. In addition, the disordered CNTs formed early in the creation process in the array of CNTs and located on the top of the arrays can be easily removed by the plasma etching. The resulting CNT film can be more easily pulled/drawn from the etched array of CNTs. During the pulling/drawing process, as the initial CNTs are drawn out in segments, other CNT segments are also drawn out end to end, due to the van Der Waals force between ends of the adjacent CNTs. Furthermore, the CNTs of the CNT film obtained by the above method are arrayed along a same direction and have great conductivity along their length such that the CNT film has excellent conductivity in its length direction. By taking advantage of such properties, the CNT film of the embodiment can be used as a material for a touch panel, LCD, LED, or other fields.

It is also to be understood that the above description and the claims drawn to a method may include some indication in reference to certain steps. However, the indication used is only to be viewed for identification purposes and not as a suggestion as to an order for the steps.

What is claimed is:

1. A method for fabricating a carbon nanotube film, the method comprising the steps of:
   (a) providing an array of carbon nanotubes formed on a substrate, the array of carbon nanotubes comprises a top section comprising disordered CNTs, wherein growing directions of the disordered CNTs are not perpendicular to the substrate, wherein step (a) comprises:
      (a1) forming a catalyst layer on the substrate;
      (a2) annealing the substrate with the catalyst layer in an ambient temperature of about 700° C. to about 900° C.;
      (a3) heating the substrate with the catalyst in an ambient temperature of about 500° C. to about 740° C. with a protective gas; and
      (a4) growing the array of carbon nanotubes on the substrate by supplying only a carbon source gas for about 5 to about 30 minutes, wherein the carbon source gas is a hydrocarbon gas;
   (b) etching the array of carbon nanotubes by a plasma treatment to remove the disordered CNTs at the top section of the array of carbon nanotubes; and
   (c) obtaining a carbon nanotube film from the array of carbon nanotubes that has been plasma treated.

2. The method as claimed in claim 1, wherein step (b) is performed in a Reactive Ion Etching machine.

3. The method as claimed in claim 1, wherein the light transmission rate of the carbon nanotube film is from about 70% to about 90%.

4. The method as claimed in claim 1, wherein step (b) comprises:
   (b1) placing the array of carbon nanotubes in a vacuum chamber;
   (b2) introducing a reactive gas into the vacuum chamber; and
   (b3) producing plasma to etch the disordered CNTs at the top section of the array of carbon nanotubes.

5. The method as claimed in claim 4, wherein step (c) comprises:
   (c1) selecting a plurality of carbon nanotubes from the array of carbon nanotube that has been plasma treated; and
   (c2) pulling the plurality of carbon nanotubes from the array of carbon nanotube at a substantially constant speed to form the carbon nanotube film.

6. The method as claimed in claim 4, wherein the gas pressure in the vacuum chamber is from about 1 to about 100 Pa, and a flow rate of the reactive gas is ranged from about 10 to about 100 standard cubic centimeters per minute (sccm).

7. The method as claimed in claim 4, wherein the reactive time between the plasma and the array of carbon nanotubes ranges from about 10 seconds to about 1 hour.

8. The method as claimed in claim 4, wherein the plasma comprises charged ions and electrons which physically hit surfaces of the disordered CNTs or react with carbon atoms in the disordered CNTs to etch away the disordered CNTs.

9. The method as claimed in claim 4, wherein the reactive gas is selected from the group consisting of oxygen, hydrogen, and carbon tetrafluoride; the plasma is selected from the group consisting of oxygen plasma, hydrogen plasma, and carbon tetrafluoride plasma.

10. The method as claimed in claim 4, wherein the plasma is produced by glow-discharge.

11. The method as claimed in claim 10, wherein a power of the plasma is in a range from about 20 to about 300 Watts.

12. A method for fabricating a carbon nanotube film, comprising the steps of:
   (a) providing an array of carbon nanotubes formed on a substrate, the array of carbon nanotubes comprises a top section comprising disordered CNTs, wherein growing directions of the disordered CNTs are not perpendicular to the substrate, wherein step (a) comprises:
      (a1) forming a catalyst layer on the substrate;
      (a2) annealing the substrate with the catalyst layer in an ambient temperature of about 700° C. to about 900° C.;
      (a3) heating the substrate with the catalyst in an ambient temperature of about 500° C. to about 740° C. with a protective gas, wherein the protective gas is a noble gas; and
      (a4) growing the array of carbon nanotubes on the substrate by supplying only a hydrocarbon gas for about 5 to about 30 minutes, wherein the hydrocarbon gas is ethylene, methane, or acetylene;
   (b) treating the array of carbon nanotubes by plasma etching process, wherein the array of carbon nanotubes is contained in a vacuum chamber and reactive gas is provided in the vacuum chamber; and
   (c) pulling out a carbon nanotube film from the array of carbon nanotubes that has been plasma etched;
   wherein during the plasma etching process, the disordered CNTs at the top section of the array of carbon nanotubes are etched away and removed by the plasma etching process.

13. The method as claimed in claim 12, wherein the reactive gas forms plasma by glow-discharge to etch away the disordered CNTs.

14. The method as claimed in claim 3, wherein a growth time of the array of carbon nanotubes is about 15 minutes.

15. The method as claimed in claim 14, wherein the array of carbon nanotubes is treated by the plasma etching process for a period of time such that the carbon nanotube film drawn from the array of carbon nanotubes that has been plasma treated has a light transmission rate of about 90% when the carbon nanotube film is irradiated with light of 900 nanometer wavelength.

16. The method as claimed in claim 14, wherein the array of carbon nanotubes is treated by the plasma etching process for a period of time such that the carbon nanotube film drawn from the array of carbon nanotubes that has been plasma treated has a light transmission rate of about 85% when the carbon nanotube film is irradiated with light of 550 nanometer wavelength.

* * * * *